US011621625B2

(12) United States Patent
Karadi et al.

(10) Patent No.: US 11,621,625 B2
(45) Date of Patent: Apr. 4, 2023

(54) CONTROLLER FOR A POWER SUPPLY AND A POWER SUPPLY

(71) Applicant: NXP B.V., Eindhoven (NL)

(72) Inventors: Ravichandra Karadi, Eindhoven (NL);
Matthias Rose, Helmond (NL);
Hendrik Johannes Bergveld,
Eindhoven (NL); Marcel Dijkstra,
Eindhoven (NL)

(73) Assignee: NXP B.V., Eindhoven (NL)

( * ) Notice: Subject to any disclaimer, the term of this patent is extended or adjusted under 35 U.S.C. 154(b) by 43 days.

(21) Appl. No.: 17/303,127

(22) Filed: May 20, 2021

(65) Prior Publication Data
US 2021/0384825 A1 Dec. 9, 2021

(30) Foreign Application Priority Data

Jun. 5, 2020 (EP) ..................................... 20178550

(51) Int. Cl.
*H02M 3/158* (2006.01)
*H02M 1/00* (2006.01)
*H02M 3/157* (2006.01)

(52) U.S. Cl.
CPC ....... *H02M 1/0035* (2021.05); *H02M 1/0025* (2021.05); *H02M 3/157* (2013.01); *H02M 3/158* (2013.01)

(58) Field of Classification Search
CPC ............. H02M 1/0035; H02M 1/0032; H02M 1/0025; H02M 3/157
See application file for complete search history.

(56) References Cited

U.S. PATENT DOCUMENTS

| 6,724,174 | B1 | 4/2004 | Esteves et al. | |
| 7,352,161 | B2 | 4/2008 | Tiew et al. | |
| 7,750,615 | B2 | 7/2010 | Jung et al. | |
| 9,318,966 | B2 | 4/2016 | Ferrazza et al. | |
| 11,038,427 | B1* | 6/2021 | Harshey | H02M 3/1588 |
| 2008/0175029 | A1* | 7/2008 | Jung | H02M 3/156 363/79 |
| 2013/0043851 | A1 | 2/2013 | Ishino | |
| 2016/0276931 | A1* | 9/2016 | Trichy | H02M 3/158 |
| 2019/0157975 | A1* | 5/2019 | Vanin | H02M 3/158 |
| 2019/0238054 | A1* | 8/2019 | Flaibani | H02M 3/158 |
| 2021/0226470 | A1* | 7/2021 | Luo | H02M 1/0009 |

FOREIGN PATENT DOCUMENTS

EP 2985900 A1 2/2016

* cited by examiner

*Primary Examiner* — Alex Torres-Rivera

(57) ABSTRACT

A burst-mode controller for a DC-DC converter includes an output module configured to provide a switch control signal to the DC-DC converter. The switch control signal includes a plurality of burst windows, each burst window corresponding to a period of a fixed-frequency burst clock and having a number of switching cycles. The burst-mode controller includes an on-time-control-module configured to receive a compensation signal based on the output voltage of the DC-DC converter, and set an on-time of the switching cycles of the switch control signal based on the compensation signal. The burst-mode controller also includes a burst-control-module configured to regulate the on-time of the switching cycles of the switch control signal by setting the number of switching cycles for each burst window of the switch control signal.

18 Claims, 9 Drawing Sheets

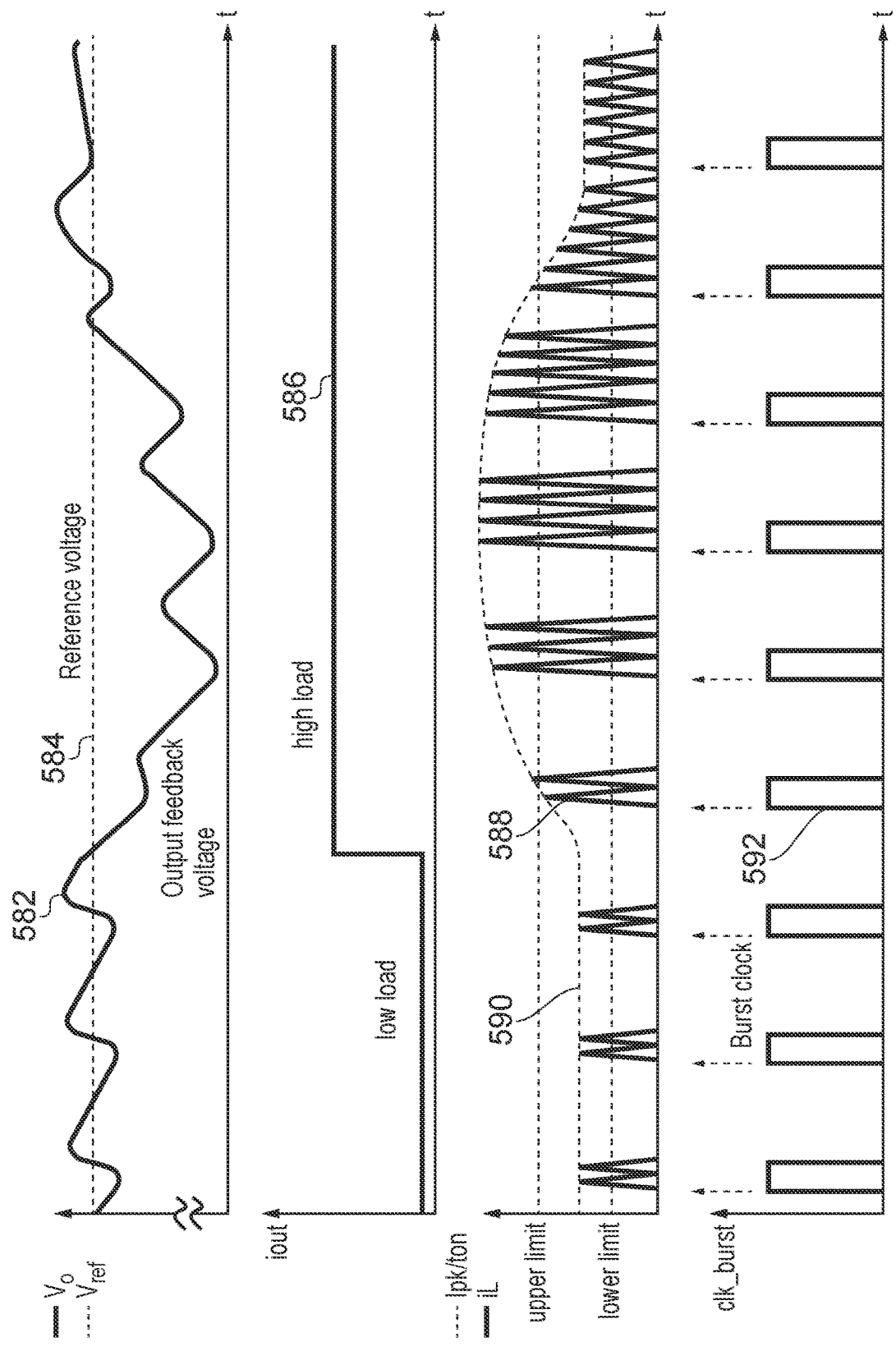

CONTROLLER FOR A POWER SUPPLY AND A POWER SUPPLY

CROSS-REFERENCE TO RELATED APPLICATIONS

This application claims the priority under 35 U.S.C. § 119 of European Patent application no. 20178550.8, filed on 5 Jun. 2020, the contents of which are incorporated by reference herein.

FIELD

The present disclosure relates to the field of controllers for DC-DC converters. In particular, the present disclosure relates to a controller for controlling a DC-DC converter and a DC-DC converter for use with noise-sensitive loads.

SUMMARY

According to a first aspect of the present disclosure there is provided a burst-mode controller for a DC-DC converter, the controller comprising:
  an output module configured to provide a switch control signal to the DC-DC converter, the switch control signal comprising a plurality of burst windows, each burst window corresponding to a period of a fixed-frequency burst clock and comprising a number of switching cycles;
  an on-time-control-module configured to:
    receive a compensation signal, wherein the compensation signal is based on the output voltage of the DC-DC converter; and
    set an on-time of the switching cycles of the switch control signal based on the compensation signal; and
  a burst-control-module configured to regulate the on-time of the switching cycles of the switch control signal by setting the number of switching cycles for each burst window of the switch control signal.

By using a fixed-frequency burst clock, with switching cycles clustered in burst windows, the controller can maintain a constant fundamental frequency of the output voltage ripple irrespective of the load. This fixed fundamental frequency of the output voltage ripple can provide a predictable output voltage spectrum and reduce spectral noise. Furthermore, by restricting the on-time to a target range, the efficiency of the controller 424 can remain high for a wide range of load currents.

In one or more embodiments the burst-control module may be configured to: receive a second compensation signal, wherein the second compensation signal is based on the output voltage of the DC-DC converter; and set the number of switching cycles for each burst window of the switch control signal to regulate the second compensation signal to a target range. The second compensation signal may comprise: a separate signal to the compensation signal; or the compensation signal.

In one or more embodiments the burst-control-module may be configured to:
  receive the compensation signal; and
  set the number of switching cycles for each burst window of the switch control signal to regulate the compensation signal to a target range.

In one or more embodiments the burst-control-module may be configured to regulate the compensation signal to the target range by:
  increasing the number of switching cycles if the compensation signal is greater than an upper-limit of the target range; and
  decreasing the number of switching cycles if the compensation signal is less than a lower-limit of the target range.

In one or more embodiments the burst-control-module may be configured to increment or decrement the number of switching cycles by one switching cycle if the compensation signal is outside the target range.

In one or more embodiments the burst-control-module may be configured to:
  determine a deviation of the compensation signal from the target range; and
  set the number of switching cycles based on the deviation.

In one or more embodiments the burst-control-module may be configured to set the number of switching cycles at each rising or falling edge of the fixed-frequency burst clock.

In one or more embodiments the controller may be configured to operate in a pulse-frequency-modulation, PFM, mode if the burst-control-module sets the number of switching cycles to one and the compensation signal is less than a lower-limit of the target range.

In one or more embodiments the PFM mode may comprise a pulse-skipping mode, wherein the burst-mode controller sets the number of switching cycles to zero for one or more burst windows of the switch control signal.

In one or more embodiments the burst-mode controller may further comprise a PFM module configured to provide the PFM mode by producing a single switching cycle on-demand for one or more burst windows of the switch control signal if an output voltage of the DC-DC converter is less than a reference voltage.

In one or more embodiments the burst-mode controller may be configured to control the DC-DC converter such that a current of an inductor in the DC-DC converter returns to zero between successive switching cycles of the bursts of the switch control signal.

In one or more embodiments, if the number of switching cycles of the bursts of the switch control signal is equal to a maximum cycle number, the burst-mode controller may be configured to control the DC-DC converter such that a current of an inductor in the DC-DC converter does not return to zero between successive switching cycles of the bursts of the switch control signal.

In one or more embodiments the compensation signal may be based on a comparison of the output voltage of the DC-DC converter to a reference voltage.

In one or more embodiments the burst-mode controller may further comprise an error module configured to provide the compensation signal. The error module may comprise a $g_m$-stage error amplifier.

In one or more embodiments the burst-control-module may comprise:
  a cycle setter configured to:
    compare the compensation signal to the target range at each rising or falling edge of the fixed-frequency burst clock; and
    output a total cycle signal defining the total number of switching cycles for a burst of the switch control signal;
  a cycle counter configured to count the number of switching cycles of the burst and output a cycle count signal; and
  a cycle comparator circuit configured to:

compare the total cycle signal to the cycle count signal; and output a burst-mode enable signal to the output module and the on-time-control-module, for indicating that a further switching cycle should be produced, based on the comparison of the cycle-count-signal and the total cycle signal.

In one or more embodiments the on-time-control module may comprise a ramp generator. The on-time-control module may be configured to:

compare a ramp voltage from the ramp generator to the compensation signal; and set the on-time of the switch control signal based on the comparison.

In one or more embodiments the on-time-control module may be configured to:

compare a current signal, indicative of an inductor current of the DC-DC converter, to the compensation voltage; and set the on-time of the switch control signal based on the comparison.

According to a further aspect of the present disclosure there is provided a DC-DC converter comprising any burst-mode controller disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 5 illustrates waveforms associated with the controller of FIG. 4A;

DETAILED DESCRIPTION

It is becoming increasingly important for switched-mode DC-DC converters to control the output voltage and input current spectrum. The main reason is that such converters are more commonly used to supply noise-sensitive loads such as Bluetooth or NFC transceivers. These transceivers are usually sensitive only to noise in a certain frequency range, i.e. the frequency range applicable to the signals they process. The control architecture of the DC-DC converter needs to ensure by design that harmonics are predominantly generated outside of the sensitive frequency band of the load or inside that band at a fixed location, such that specific filtering means can be applied to filter these harmonics out.

Low-power switched-mode DC-DC converters often operate in discontinuous conduction mode (DCM). In DCM operation, the inductor current returns to zero between switching cycles. DCM operation is a trend that is driven by miniaturization. The size of inductors in low-power DC-DC converters is decreasing (or even package integrated) leading to smaller inductance values. Smaller inductance values lead to larger inductor current differences (or deltas) for a given switching-frequency. Hence continuous conduction mode can only be sustained for heavy loads at very high switching frequencies leading to lower efficiency.

A low-power DC-DC converter operating in DCM can be controlled with a pulse-frequency modulation (PFM) controller or a pulse-width modulation (PWM) controller.

Figure 1A:
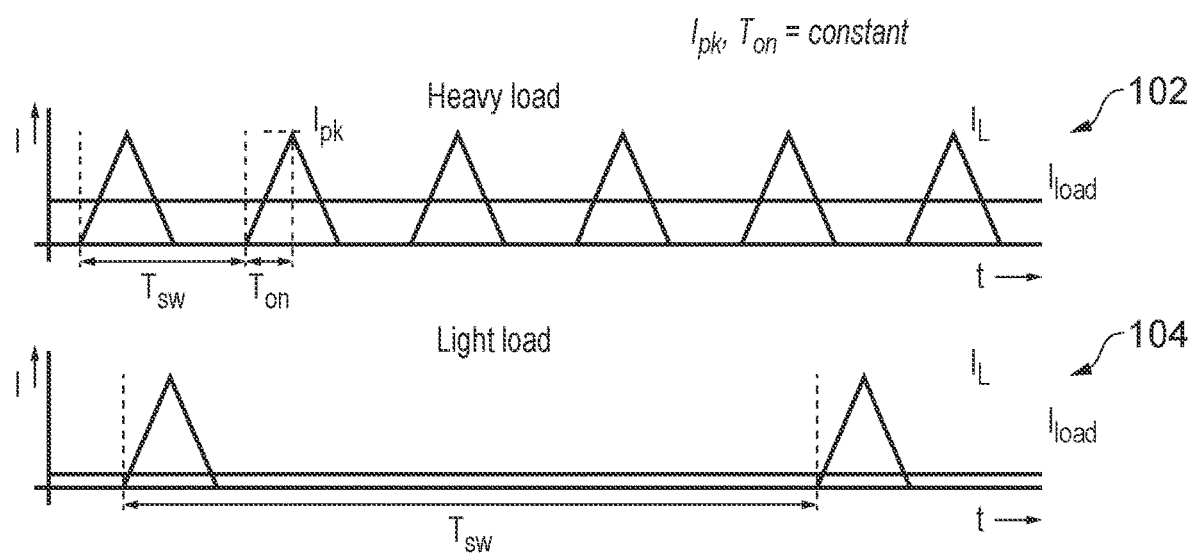
FIG. 1A illustrates the operating principle of a PFM controller operating a DC-DC converter in discontinuous conduction mode, DCM.

FIG. 1A illustrates the operating principle of a PFM controller operating a DC-DC converter in DCM. A current, $I_L$, in the inductor of the DC-DC converter is shown plotted against time. A first PFM plot 102 depicting PFM mode shows the inductor current for a heavy load at the output of the DC-DC converter. A second PFM plot 104 depicting PFM mode shows the inductor current for a light load coupled to the output of the DC-DC converter. The load current, $I_{load}$, is also illustrated for both the heavy load and the light load. The PFM controller operates at a lower frequency with longer switching period, $T_{sw}$, for the light load relative to the heavy load to meet the load current requirement. A peak inductor current, $I_{pk}$, (or equivalently an on-time, $T_{on}$, of a power switch of the DC-DC converter, during which the current through this power switch as well as the inductor rises to the peak current value $I_{pk}$) is kept constant irrespective of the load current, $I_{load}$. Instead the pulse frequency changes with the load.

An advantage of a PFM controller is that the efficiency can be high over a wide load range, because the switching and conduction losses scale with the load current. A disadvantage of a PFM controller is that the switching frequency can vary over a wide range, for example from kHz to MHz, because the switching frequency is dependent on the load current. This can make PFM controllers unsuitable for noise-sensitive loads as the switching frequency might coincide with a sensitive frequency range of the load.

Figure 1B:
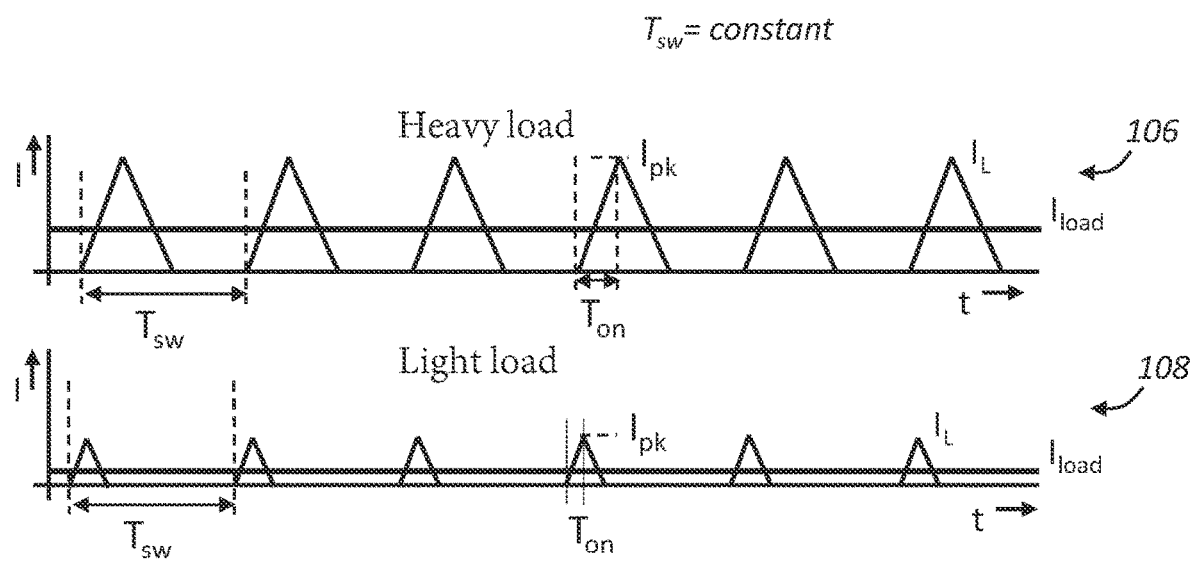
FIG. 1B illustrates the operating principle of a PWM controller operating a DC-DC converter in DCM.

FIG. 1B illustrates the operating principle of a PWM controller operating a DC-DC converter in DCM. First and second PWM plots 106, 108 show inductor current, $I_L$, and load current, $I_{load}$, for a heavy load and a light load, respectively. The PWM controller operates with a fixed switching frequency (so switching period $T_{sw}$ is constant) that remains constant irrespective of the load current, $I_{load}$. The PWM controller regulates the output voltage of the DC-DC converter by changing the duty cycle (pulse width) and therefore the inductor peak current. The on-time, $T_{on}$, of the power switch of the DC-DC converter and the inductor peak current, $I_{pk}$, increase with the load while the switching frequency remains constant.

The peak inductor current, $I_{pk}$, depends on the load current, $I_{load}$, input voltage, $V_{in}$, output voltage, $V_{out}$, switching-frequency, $f_{sw}$, and inductor value, L. For the ideal case of a 100% efficient PWM DC-DC converter the peak inductor current, $I_{pk}$, is described by the following equation:

$$I_{pk} = \sqrt{\frac{2V_{out}(V_{in} - V_{out})}{LV_{in}} \frac{I_{load}}{f_{sw}}}$$

The on-time, $T_{on}$, is directly proportional to the peak current, $I_{pk}$, according to the following equation:

$$T_{on} = \frac{L}{V_{in} - V_{out}} I_{pk}$$

Figure 2:
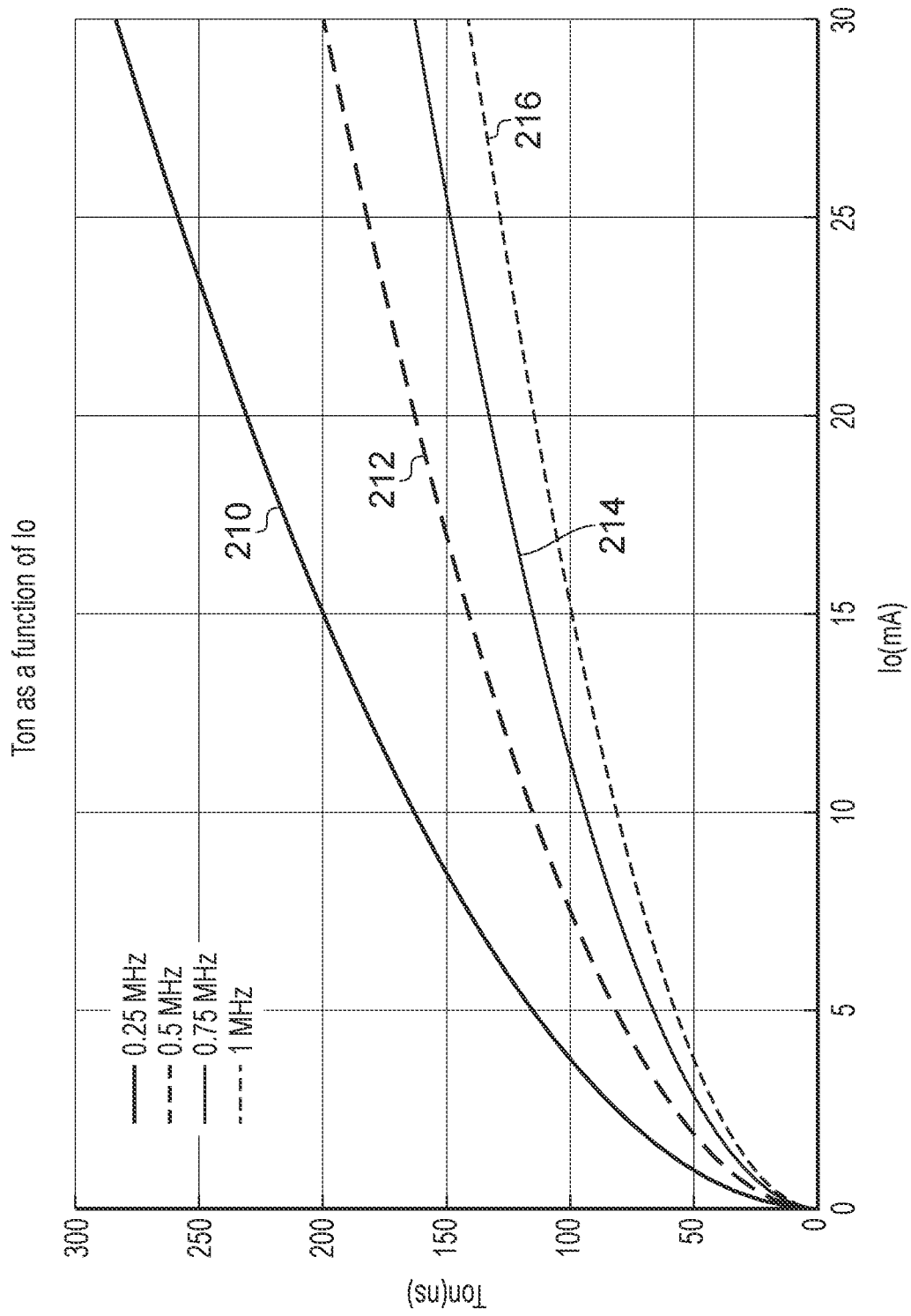
FIG. 2 illustrates the load-dependence of the on-time for a PWM-controlled DC-DC converter operating in DCM.

FIG. 2 illustrates the load-dependence of the on-time, $T_{on}$, for a PWM converter. The on-time, $T_{on}$, is plotted versus load current (represented as $I_o$ in the drawing) for four different fixed switching frequencies: 250 kHz 210, 500 kHz 212, 0.75 MHz 214 and 1 MHz 216. In accordance with the above equations, lower switching frequencies correspond to higher on-times.

Figure 3:
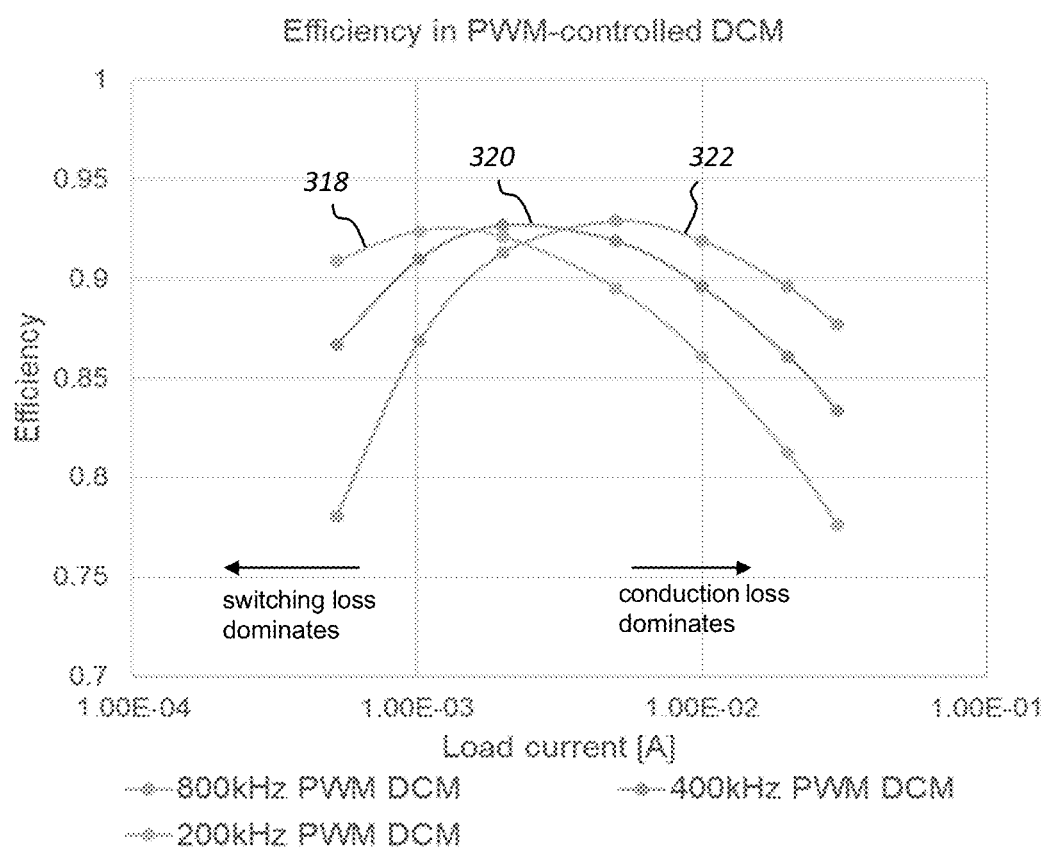
FIG. 3 illustrates operating efficiency as a function of load for a PWM-controlled DC-DC converter operating in DCM.

A disadvantage of real PWM converters results from the dependency of the on-time on the load current. Optimal efficiency at the fixed switching frequency can only be achieved for one optimal value of load current (for a given set of boundary conditions: input/output voltage, inductor and power switch size). This effect is illustrated in FIG. 3, in which converter efficiency is plotted versus load current for three different fixed switching frequencies, 200 kHz 318, 400 kHz 320 and 800 kHz 322. For a particular fixed switching frequency, the efficiency peaks at an optimal value of the load current. If the load current is lower than the optimal load current, switching losses dominate and the efficiency drops.

If the load current is higher than the optimal load current, the efficiency drops because of dominating conduction losses.

Figure 4A:
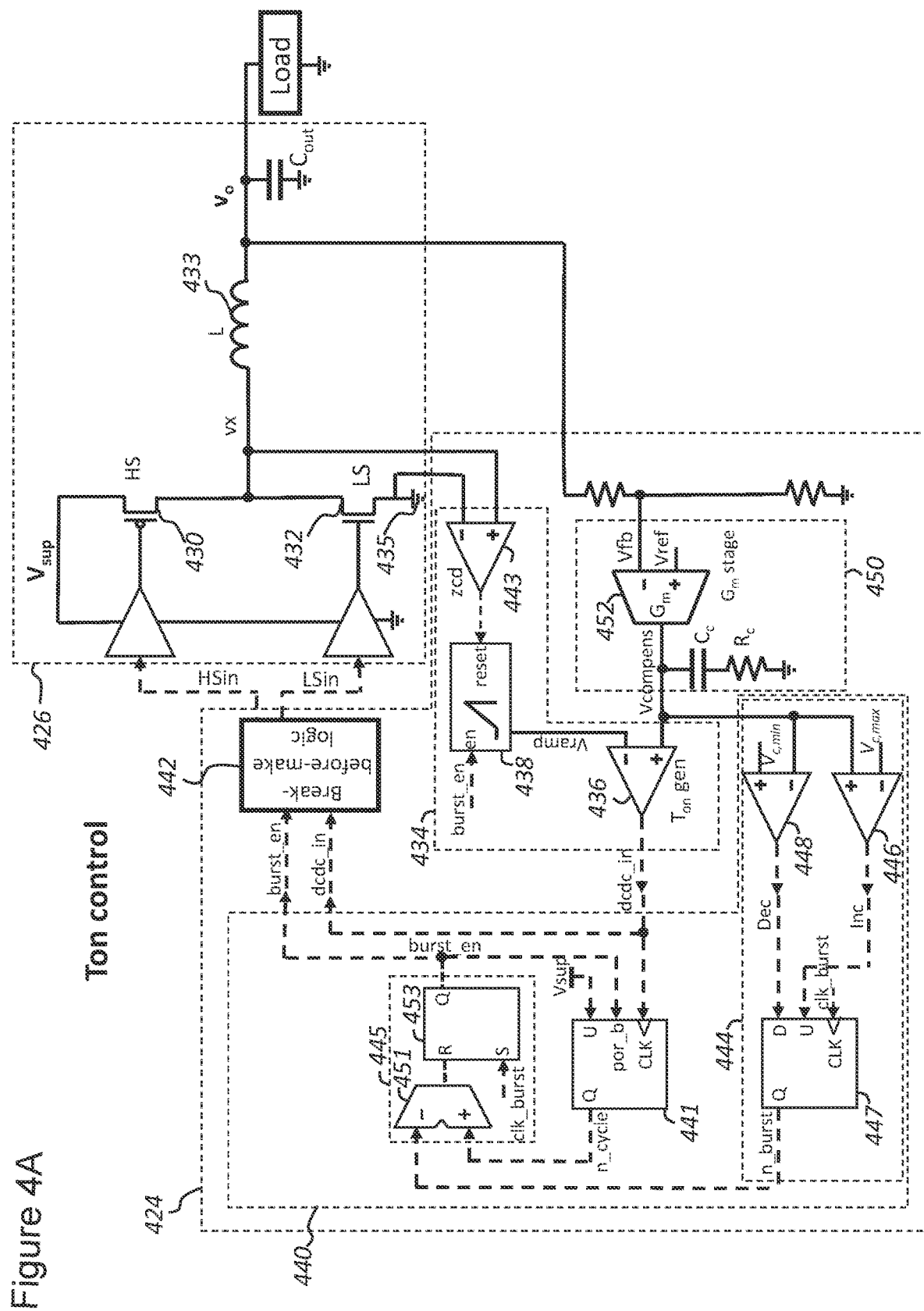
FIG. 4A illustrates a controller for a DC-DC converter according to an embodiment of the present disclosure.

FIG. 4A illustrates a controller 424 for a DC-DC converter 426 according to an embodiment of the present disclosure. The illustrated controller 424 can operate a low-power DC-DC converter 426 in burst mode. In burst mode, the controller 424 can control the switching of the DC-DC converter 426 with bursts of switching cycles according to a fixed-frequency burst clock. During each switching cycle, an inductor current of the DC-DC converter 426 can ramp up from a valley current to a peak inductor current and then ramp down to the valley current again. The valley current can be equal to, larger or smaller than zero. Between bursts, the inductor current can be zero. As will be discussed further below, the controller 424 can combine a continuous on-time control with a burst-mode control. In this way, the controller 424 can combine the advantages of PWM and PFM controllers.

The controller 424 comprises an output module 442, an on-time-control-module 434 and a burst-control-module 440. The output module 442 provides a switch control signal to the DC-DC converter 426. The switch control signal comprises a plurality of burst windows each burst window corresponding to a period of a fixed-frequency burst clock and comprising a number of switching cycles. In this way, each burst window can comprise a burst of switching cycles and the switch control signal can comprise a sequence of bursts corresponding to the fixed-frequency burst clock. The on-time-control-module 434 sets an on-time of the switch control signal based on a compensation-signal, $V_{compens}$, representative of an output voltage, $V_o$, of the DC-DC converter. The burst-control-module 440 regulates the on-time of the switching cycles by setting the number of switching cycles for each burst window of the switch control signal. In this way, the burst-control-module 440 can set the number of switching cycles for each burst of the switch control signal.

In some examples, the burst-control-module 440 may receive the compensation signal and set the number of switching cycles for each burst window of the switch control signal to regulate the compensation signal to a target range. By regulating the compensation signal to the target range, the burst-control-module 440 effectively regulates the on-time of the switch control signal (and therefore peak inductor current) to an equivalent target range because the on-time-control-module sets the on-time based on the compensation signal. In this way, the controller 424 regulates the output voltage, $V_o$, by setting the on-time via the on-time-control-module 434 based on the compensation signal. The burst-control-module 424 further refines or regulates the on-time (by regulating the compensation signal) to within a fixed range by setting the number of switching cycles in the burst windows.

By using a fixed-frequency burst clock, with switching cycles clustered in bursts, the controller 424 maintains a constant fundamental frequency of the output voltage ripple irrespective of the load, unlike the continuous change in switching frequency of a PFM controller. This fixed fundamental frequency of the output voltage ripple can provide a predictable output voltage spectrum and reduce spectral noise. Furthermore, by restricting the on-time/peak inductor current to a target range (by regulating the compensation signal to a target range), instead of the unconstrained variation of on-time/peak current in PWM, the efficiency of the controller 424 can remain high for a wider range of load currents.

In this example, the on-time-control-module 434 and the burst-control-module 440 both receive the same compensation signal provided by an error module 450. In other examples, the on-time-control-module 434 and the burst-control-module 440 may receive a respective first compensation signal and separate second compensation signal provided by either the error module 450 or by separate error modules. The first compensation signal and second compensation signals are both representative of the output voltage, $V_o$. Therefore, when the burst-control-module 440 regulates the second compensation signal to a target range, the first compensation signal is also regulated to an equivalent target range because both compensation signals depend on the output voltage, $V_o$. In the embodiments described herein, it will be understood that compensation signal may equivalently refer to a first or second compensation signal as appropriate.

The output module 442 is configured to provide the switch control signal to the DC-DC converter 426. In this example, the output module 442 comprises a break-before-make (BBM) logic circuit. The switch control signal comprises a plurality of burst windows corresponding to a period of the fixed-frequency burst clock. Each burst window may comprise a burst of one or more switching cycles. During a switching cycle, the controller can switch the power switches 430, 432 of the DC-DC converter such that the inductor current ramps up from a valley current to a peak inductor current and back down again. Each switching cycle comprises an on-time corresponding to the time that the inductor current ramps from the valley current to the peak inductor current. In this example the output module 442 provides the switch control signal as a high-side signal, HSin, and a low-side signal, LSin, to respective high-side and low-side power switches 430, 432 of the DC-DC converter 426. The on-time of the switch control signal defines the on-time of the high-side power switch 430, that is the time the high-side power switch 430 is 'on' or closed during a switching cycle. The fixed-frequency burst clock defines the period of the burst windows or the frequency at which the bursts of switching cycles occur.

The on-time-control-module 434 receives the compensation signal, $V_{compens}$, from the error module 450. The on-time-control-module 434 sets the on-time of the switch control signal based on the compensation signal, $V_{compens}$. In this example, the on-time-control-module 434 comprises an on-time generator, $T_{on}$ gen, comprising a comparator 436. The comparator 436 can compare the compensation signal, $V_{compens}$, to a reference signal.

In this example, the reference signal, Vramp, is provided by a voltage ramp generator 438 of the on-time-control-module 434. By providing the reference signal in this way, the controller 424 can operate in a voltage mode with on-time control. The voltage ramp generator 438 may receive a trigger signal from a zero-current detector, zcd, 443 for defining the end of a switching cycle and the start of any subsequent switching cycle in a particular burst. The zero-current-detector 443 can provide the trigger signal when an inductor current in the inductor 433 of the DC-DC converter is zero. In this way, the controller 424 can operate the DC-DC converter 426 in a burst mode in which the current of the inductor 433 returns to zero between successive switching cycles of a particular burst (valley current equals zero).

In some examples, the controller 424 can operate the DC-DC converter 426 in a burst mode in which the current of the inductor 433 does not return to zero between the switching cycles of a particular burst window (valley current greater than zero). This can increase the average inductor current during a burst of switching cycles and provide higher load currents while remaining in burst mode. In some examples, the controller can operate the DC-DC converter in a burst mode with a valley current less than zero. This can improve efficiency by enabling zero-voltage switching for a rising edge of a node, vx, located between the two power switches 430, 432. The controller 424 can operate with a positive or negative non-zero valley current by applying a positive or negative offset to a comparator of the zero current detector 443. As discussed further below, the controller 424 may set the valley current based on the number of switching cycles set by the burst-control-module 440.

In this example, the voltage ramp generator 438 also receives a burst enable signal, burst_en, from the burst-control-module 440. As discussed further below, the burst enable signal, burst_en, can indicate that a further switching cycle should be produced. In other words, the burst enable signal, burst_en, can indicate that a burst of switching cycles is ongoing, for example burst_en=1, or that the controller 424 is between bursts, for example, burst_en=0.

The on-time-control-module 434 may set the on-time of the switch control signal by providing an on-time signal, dcdc_in, to the output module 442. The on-time signal may comprise a two-level signal, wherein changes in signal level may correspond to the start or the end of the on-time and/or the switching cycle. Operation of the controller and response to the on-time signal, dcdc_in, is discussed further below.

Figure 4B:
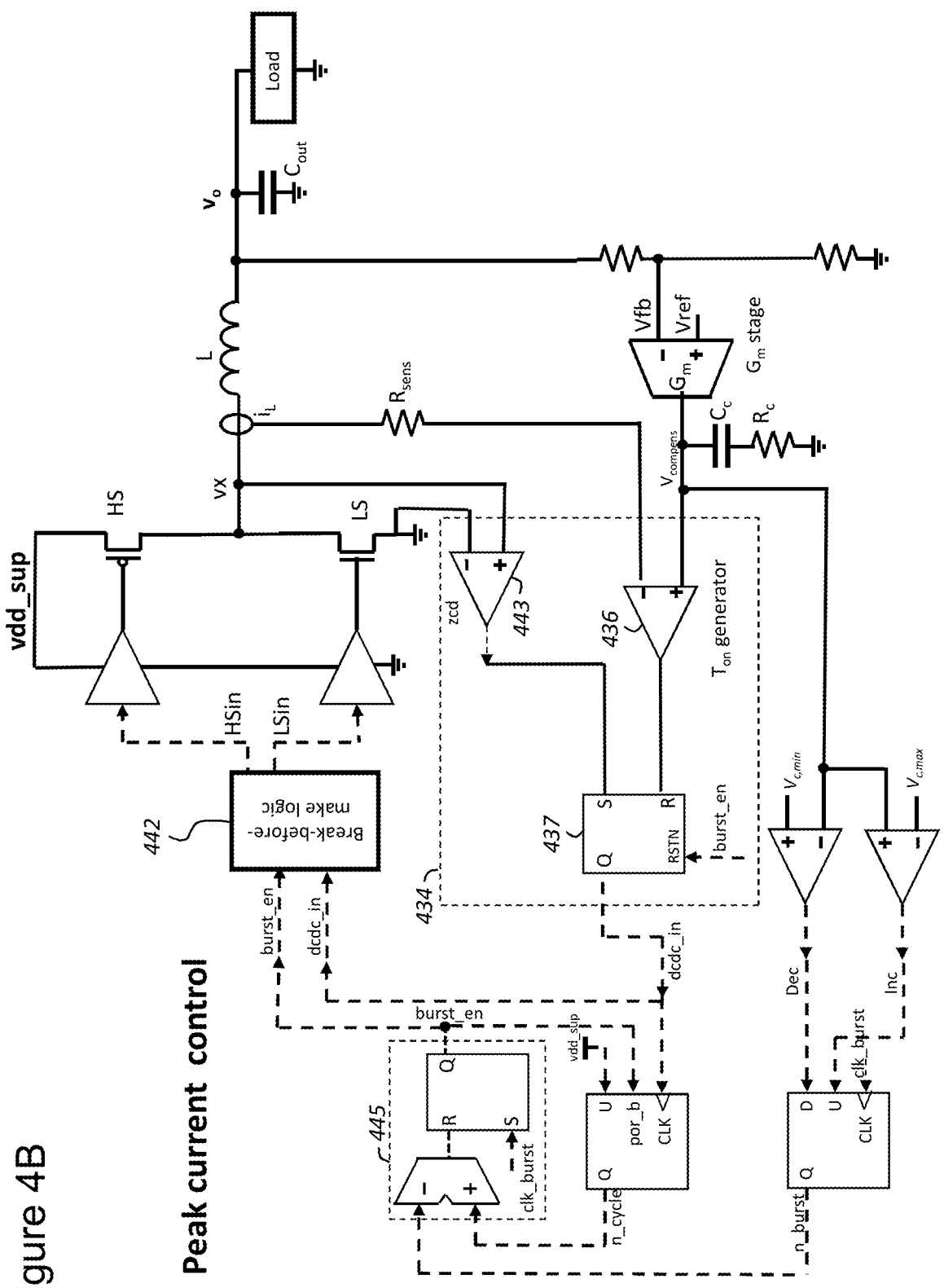
FIG. 4B illustrates a controller for a DC-DC converter operating in current-mode control according to a further embodiment of the present disclosure.

FIG. 4B illustrates an alternative embodiment of the controller 424 operating in a current-mode with peak-current control. The embodiment is substantially the same with the exception of the on-time-control-module 434. In this example, the comparator 436 of the on-time-control-module 434 receives a reference signal comprising a signal from a sense circuit which detects the inductor current. In this example, the on-time control-module 434 further comprises an on-time flipflop 437. The on-time flipflop 437 is a SR flipflop that receives: an output of the comparator 436 at a R terminal; a trigger signal from the zero-current detector 443 at a S terminal; and the burst enable signal, burst_en, at a reset (RSTN) terminal. The on-time flipflop 437 provides the on-time signal, dcdc_in, to the output module 442 for indicating the start and end of the on-time and/or switching cycle based on the trigger signal from the zero-detection-current 443 and the output of the comparator 436.

Using an on-time generator (voltage ramp generator 438) in a voltage mode can simplify the design of the controller 424 by avoiding the need for a current-sense circuit. However, in some examples, the controller may use a controlled peak current (as illustrated in FIG. 4B) instead of an on-time and still realise at least some of the benefits disclosed herein.

Returning to FIG. 4A, in this example, the burst-control-module 440 also receives the compensation signal, $V_{compens}$, from the error module 450. The burst-control-module 440 can regulate the compensation signal, $V_{compens}$, to the target range by setting the number of switching cycles in the bursts of the switch control signal.

The burst-control-module 440 comprises: a cycle setter 444, a cycle counter 441 and a cycle comparator circuit 445. At each rising edge of the fixed-frequency burst clock, the cycle setter 444 receives the compensation signal, $V_{compens}$, from the error module 450, sets a total number of switching cycles for the burst window, and corresponding burst and outputs a total cycle signal, n_burst, defining the total number of switching cycles per burst. The cycle counter 441 counts the number of completed switching cycles in the burst and outputs a cycle count signal, n_cycle, defining a cycle count value. The cycle comparator circuit 445 receives and compares the total cycle signal, n_burst, from the cycle setter 444 and the cycle count signal, n_cycle, from the cycle counter 441. The cycle comparator circuit 445 outputs the burst enable signal, burst_en, based on the comparison between the total cycle signal, n_burst, and the cycle count signal, n_cycle. The cycle comparator circuit 445 may output a logic 1 value of the burst enable signal, burst_en, while a value of the cycle count signal, n_cycle, is less than a value of the total burst signal, n_burst, indicating that the controller 424 is to continue producing switching cycles for the burst.

In this example, the cycle setter 444 comprises a cycle total register 447, an upper-limit comparator 446 and a lower-limit comparator 448. The upper-limit comparator 446 and the lower-limit comparator 448 compare the compensation signal, $V_{compens}$, to a respective upper-limit, $V_{c,max}$, and lower-limit, $V_{c,min}$. In this way, the cycle setter 444 compares the compensation signal, $V_{compens}$, to the target range, $V_{c,min}$–$V_{c,max}$. As the on-time controller 434 sets the on-time (and therefore the resulting peak inductor current) based on the compensation signal, $V_{compens}$, the upper and lower-limits, $V_{c,max}$, $V_{c,min}$, can be set to correspond to an equivalent on-time target range or peak-inductor-current target range. This can be a range that achieves an acceptable level of efficiency of the DC-DC converter 426.

The cycle total register 447 can store a total cycle value corresponding to the total number of switching cycles that should be provided in a burst window, or single burst, of the switch control signal. The cycle total register 447 can provide the total cycle signal, n_burst, representative of the total cycle value. In this example, the cycle total register 447 comprises a flipflop. The cycle total register 447 can receive an increment signal, Inc, or a decrement signal, Dec, from the upper-limit comparator 446 and the lower-limit comparator 448, respectively. The cycle total register 447 can increment or decrement the total cycle value based on the increment signal, Inc, or the decrement signal, Dec, and output an updated total cycle signal, n_burst. In this way, the cycle setter 444 of the burst-control-module 440 regulates the compensation signal, $V_{compens}$, to the target range by setting the number of switching cycles for each burst window of the switch control signal. In this way, the cycle setter 444 of the burst-control-module 440 regulates the on-time of the switch control signal by setting the number of switching cycles for each burst window of the switch control signal.

In this example, the cycle total register 447 increments or decrements the total cycle value by 1 if the increment signal, Inc, or decrement signal, Dec, indicates that the compensation signal, $V_{compens}$, is outside the target range. In other examples, (not illustrated) the cycle setter 444 may determine a deviation of the compensation signal, $V_{compens}$, from the target range. For example, the cycle setter 444 may determine a difference between the compensation signal and the closest boundary of the target range. In some examples, the cycle setter 444 may comprise additional comparators that compare the compensation signal, $V_{compens}$, to additional limits or ranges to determine the deviation to a rough approximation. In other examples, the cycle setter may comprise error amplifiers in place of the comparators 446, 448 to determine the deviation. The cycle setter 444 can set the number of switching cycles based on the deviation. For example, the cycle setter 444 can increase or decrease the number of switching cycles per burst (window) by more than one at a time based on the deviation. This can increase the speed of the burst-control-module 440.

In this example, the cycle total register is clocked by the fixed-frequency burst clock, clk_burst. In this way, the burst-control-module 440 (or cycle setter 444) sets the number of switching cycles (via the total cycle value and total cycle signal, n_burst) at each rising or falling edge of the fixed-frequency burst clock, clk_burst. In this way, the burst-control-module 440 sets the number of switching cycles for each burst window of the switch control signal.

In this example, the cycle counter 441 receives the on-time signal, dcdc_in, from the on-time controller 434. The cycle counter 441 can count transitions in the signal level of the on-time signal, dcdc_in, to count the number of switching cycles in the present burst. The counter may only count a particular type of transition, for example a low-to-high transition or a high-to-low transition, which may correspond to the end of a switching cycle. In this example, the cycle counter 441 comprises a flipflop and receives the on-time signal, dcdc_in, at a clock terminal (CLK). The cycle counter 441 can also receive the burst enable signal, burst_en, from the cycle comparator circuit 445. In this way, the cycle counter 441 can determine the start and end of a burst of the switch control signal and reset the count accordingly.

In this example, the cycle comparator circuit 445 comprises a cycle comparator 451 and a SR cycle comparator flipflop 453. The cycle comparator 451 compares the total cycle signal, n_burst, and the cycle count signal, n_cycle, and provides an output based on the comparison. The cycle comparator flipflop 453 receives the output of the cycle comparator 451 at a reset terminal, R, receives the fixed-frequency burst clock, clk_burst, at a set terminal, S, and outputs the burst enable signal, burst_en, accordingly. In this way, the cycle comparator flipflop 453 can only set the burst enable signal, burst_en, to a high value, indicating the start of a burst of switching cycles, in response to an edge of the fixed-frequency burst clock. As described further below, the output of the cycle comparator 451 can reset cycle comparator flipflop 453 and the burst enable signal, burst_en, to a low value when a value of the cycle count signal, n_cycle, equals (or, in some examples, is greater than) a value of the total cycle signal, n_burst, indicating the end of a burst. The cycle comparator flipflop 453 prevents the burst enable signal, burst_en, switching immediately back to a high level following a transition to a low level, as a result of the cycle counter 441 resetting the cycle count signal, n_cycle, to zero in response to the burst enable signal, burst_en.

In some examples, the controller 424 may comprise the error module 450. In other examples, the error module 450 may be located external to the controller 424, for example as part of the DC-DC converter 426, and the controller 424 may be configured to receive the compensation signal. The error module 450 may comprise an error amplifier 452. The error module 450 may compare the output voltage, $V_o$, of the DC-DC converter 426 (or, as illustrated, a feedback voltage, Vfb, representative of the output voltage) to a reference voltage, $V_{ref}$, and output the compensation signal, $V_{compens}$, based on the comparison. In this example, the error module 450 comprises an error amplifier 452 in the form of a $G_m$ stage.

Operation of the controller 424 during a sequence of bursts of the switch control signal will now be described with reference to the example of FIG. 4A and the associated waveforms illustrated in FIG. 5. It will be appreciated that the controller of FIG. 4B has a similar operation but with a current-mode control for the on-time-control-module. Description of the operation of the controller of FIG. 4B is therefore limited to the on-time control module 434.

FIG. 5 illustrates waveforms associated with the controller 424 of FIG. 4A during a sequence of bursts of the switch control signal in which the current load on the DCDC converter 426 changes. FIG. 5 illustrates the output voltage 582, the reference voltage 584, the load current 586, the inductor current 588, the peak inductor current 590 and the fixed-frequency burst clock 592.

During the first three pulses of the fixed-frequency burst clock 592, the load current is at a fixed low level. The controller 424 operates as a burst-mode controller with two switching cycles per burst, as can be seen in the inductor current 588.

The first rising edge of the fixed-frequency burst clock 592, corresponding to the start of a burst window, initiates a burst of switching cycles by setting the SR cycle comparator flipflop 453 of the cycle comparator circuit 445, asserting the burst enable signal, burst_en. The rising edge also triggers the cycle total register 447 to provide the total cycle signal, n_burst, indicating a cycle total value of 2 to the cycle comparator circuit 445. The cycle total register 447 of the cycle setter 444 stores the cycle total value from the previous burst. The cycle comparator 451 of the cycle comparator circuit 445 compares the total cycle signal n_burst, to the cycle count signal, n_cycle, which initially represents a count of zero at the start of the burst, and outputs a logic 0 value of to the R input of the SR cycle comparator flipflop 453. Since the SR cycle comparator flipflop 453 was set at the start of the burst, the cycle comparator circuit 445 outputs a logic 1 of the burst enable signal, burst_en, to the output module 442. At the same time, the ramp generator 438 receives the logic 1 value of the burst enable signal, burst_en, and resets the ramp voltage, Vramp, to zero at the start of the burst. In response, the on-time comparator 436 asserts the on-time time signal, dcdc_in, high (logic 1) at the start of the burst. As a result, the output module 442 provides the switch control signal to the high-side switch 430 of the power stage of the DC-DC converter 426, which closes (turns on) coupling a supply voltage, $V_{sup}$, to the inductor 433. The inductor current 588 increases (from zero) because the supply voltage is greater than the output voltage ($V_{sup} > V_o$). The cycle counter 441 also receives the logic 1 value of the burst enable signal, burst_en, to indicate the start of a new burst and that cycle counting should commence. In this example, the cycle count signal, n_cycle, increases to 1 to count the first cycle with the first rise of the on-time signal, dcdc_in, at the start of the burst. As a result, the cycle comparator circuit 445 is arranged to output a high value of the burst enable signal, burst_en, while the cycle count signal, n_cycle, is less than or equal to the total cycle signal, n_burst. In other examples, the cycle counter 441 may not count the first rising edge of the on-time signal, dcdc_in, for each burst and the cycle comparator circuit 445 may output a high value of the burst enable signal, burst_en, while the cycle count signal, n_cycle, is less than the total cycle signal, n_burst. In other examples, the cycle setter 444, cycle counter 441 and/or the cycle comparator circuit 445 may manipulate the cycle count signal, n_cycle, and/or the total cycle signal, n_burst, such that the burst enable signal, burst_en, remains high until the set number of switching cycles have completed.

The $g_m$-stage error amplifier 452 receives (or senses) the output voltage, $V_o$, of the DC-DC converter 426 (or the feedback voltage, Vfb), compares it to the reference voltage, $V_{ref}$, and outputs the compensation signal, $V_{compens}$, accordingly. The comparator 436 of the on-time-control-module 434 compares the compensation signal, $V_{compens}$, with the ramp voltage, Vramp, from the ramp generator 438. After a certain time, the ramp voltage, Vramp, increases to a value greater than the compensation signal, $V_{compens}$, and the on-time signal, dcdc_in, output by the comparator 436 changes level, for example from high to low (logic 1 to logic 0).

In response to the change in level of the on-time signal, dcdc_in, the output module 442 provides the switch control signal to open the high-side switch 430, and close the low-side switch 432 thereby coupling the inductor 433 to a reference terminal 435, which in this example is a ground terminal. The inductor current 588 ramps down to zero and the zero-current detector 443 triggers the reset of the voltage ramp generator 438. As a result, the ramp voltage drops back below the compensation signal, $V_{compens}$, and the comparator 436 changes the level of the on-time signal, dcdc_in, for example from low to high (logic 0 to logic 1), indicating a completion of the first switching cycle (and a start of the second switching cycle).

In response to the change in level of the on-time signal, dcdc_in, the cycle counter 441 increases the count of switching cycles from 1 to 2 and updates the cycle count signal, n_cycle. Each time a switching cycle ends, detected by the zero current detector 443, as long as the burst enable signal is high, burst_en=1, a new switching cycle is started by resetting the ramp generator 438 to zero, making the on-time signal, dcdc_in, high again. As described above, in this example, the cycle comparator circuit 445 continues to assert the burst enable signal, burst_en, to logic 1 while the cycle count signal, n_cycle, is less than or equal to the total count signal, n_burst. The cycle comparator 451 outputs a logic 0, such that the SR cycle comparator flipflop 453 is not reset and the second switching cycle can start. The output module 442 also receives the latest change in level of the on-time signal, dcdc_in, while the burst enable signal, burst_en, remains high. In response, the output module 442 provides the switch control signal to close the high-side switch 430 again, and open the low-side switch 432 thereby coupling the inductor 433 to the supply voltage, $V_{sup}$ and the whole cycle repeats for further switching cycles until the cycle count signal, n_cycle, becomes one count higher than the total cycle signal, n_burst. In this example, this occurs after two switching cycles at which point the cycle comparator circuit 445 outputs a logic 0 value of the burst enable signal, burst_en, to the output module 442. The output module 442 then opens both the low- and high-side switches 430, 432, which remain open until the beginning of the next burst at the rising edge of the next pulse of the fixed-frequency burst clock 592.

Briefly turning to the on-time-control-module 434 of FIG. 4B, between bursts (of switching cycles), the burst enable signal is low, burst_en=0, and maintains the on-time flipflop 437 in the reset state. As described above, the burst starts at a rising edge of the fixed-frequency burst clock, clk_burst, which sets the burst enable signal to logic 1, burst_en=1, removing the reset condition. The SR on-time flipflop 437 is immediately set by the output of the zero current detector 433 because the inductor current is zero at the start of the burst. The SR on-time flipflop 437 asserts the on-time signal, dcdc_in, to logic 1 and the output module 442 responds by providing the switch control signal to close the high-side switch 430. When the on-time has elapsed, i.e. when the sensed inductor current has reached the value of the compensation signal, $V_{compens}$, the on-time comparator 436 outputs a logic 1 which resets the SR on-time flipflop 437 and the on-time signal, dcdc_in, goes to logic zero again. The output module 442 opens the high-side switch 430 and closes the low-side switch 432. The inductor current drops to zero and in response, the zero-current detector 443 sets the SR on-time flipflop 437 again, starting the next switching cycle of the burst/burst window. After the number of cycles indicated by the cycle setter 444 has been reached, the burst ends, burst_en becomes zero again, keeping the SR on-time flipflop that controls the on-time signal, dcdc_in, at logic zero until the next burst starts.

In the example illustrated in FIGS. 4A and 5, the controller operates the DC-DC converter such that the inductor current 588 returns to zero between successive switching cycles within a burst. This is implemented by using the zero-current detector 443 to define the end of a switching cycle and trigger the start of the on-time of a subsequent switching cycle, if the burst enable signal, burst_en, is asserted.

Due to the finite time period between the pulses of the fixed-frequency burst clock 592 and the corresponding bursts of the switch control signal, there may be a maximum cycle number of switching cycles that can be provided for a given burst clock frequency. At very heavy loads, if the number of switching cycles in a burst window is set to the maximum cycle number and the compensation signal, $V_{compens}$, is greater than the upper-limit, $V_{c,max}$, the controller may be configured to set the valley current to a non-zero, positive value, such that the current of the inductor does not return to zero between successive switching cycles of a burst. In this way, the inductor current 588 does not return to zero between switching cycles. This can increase the maximum-load-current capability for a particular fixed-frequency burst clock frequency. Implementation of this heavy-load mode is not illustrated but may comprise configuring the on-time-control-module 434 to start the on-time of a switching cycle (via a clock or other means, such as adding an offset to the input of the zero current detector comparator 443) before the inductor current 588 has fallen to zero for the previous switching cycle.

At each rising edge of the fixed-frequency burst clock 592, the cycle setter 444 determines whether the compensation signal (or on-time/peak current 590) is within the target range ($V_{c,min}$–$V_{c,max}$). If the upper-limit and lower-limit comparators 446, 448 determine that the compensation is outside the target range, the cycle total register 447 increases or decreases the total cycle value accordingly and provides an updated total cycle signal, n_burst, to the cycle comparator circuit 445. In this way, at each rising edge of the fixed-frequency burst clock 592, the cycle setter 444 defines the number of switching cycles for the burst.

For the first three bursts, the on-time, peak current 590 and compensation signal, $V_{compens}$, all remain within the target range and the total cycle value remains fixed at two switching cycles per burst. Between the third and fourth clock pulses of the fixed-frequency burst clock 592, there is a step change in load current 586 from a low load to a high load.

When the load step occurs (light-to-heavy load step depicted) the output voltage, $V_o$, falls. As a result, the error module 450 that compares the output voltage, $V_o$, (or the feedback voltage, Vfb) to the reference voltage, $V_{ref}$, compensates the fall in output voltage by increasing the compensation signal, $V_{compens}$. The on-time of the switching cycles increases because it takes a longer time for the ramp voltage, Vramp, to exceed the compensation voltage, $V_{compens}$. Due to a longer on-time, the inductor peak current increases to deliver more energy to the output per switching cycle.

Without the burst-mode-control-module 440, the on-time and peak current would continue to increase until the higher load demands are met resulting in a high on-time and low efficiency. However, at the rising edge of the 5$^{th}$ clock cycle of the fixed-frequency burst clock 592, the cycle setter 444 will determine that the compensation signal, $V_{compens}$, (i.e. on-time or peak current 590) exceeds the upper-limit, $V_{c,max}$, of the target range. In response, the cycle setter increases the number of switching cycles in the 5$^{th}$ burst window by 1 count resulting in 3 switching cycles. Therefore, the burst enable signal, burst_en, remains high until three switching cycles are completed. The same determination is made at the rising edge of the 6$^{th}$, 7$^{th}$ and 8$^{th}$ clock cycles of the fixed-frequency burst clock, resulting in further increments in the number of switching cycles until the compensation signal falls back below the upper-limit $V_{c,max}$, of the target range.

In this example, the number of switching cycles per burst, or burst window, is increased by a single switching cycle per burst until 6 switching cycles per burst are produced to meet the higher load current 586. By increasing the number of switching cycles per burst, the inductor peak current 590 reduces to within the target range and the controller 426 finds a new equilibrium state.

In the event of a decreasing load and a resulting decrease in on-time/peak current below the lower-limit, $V_{c,min}$, the burst-control-module 440 will reduce the number of switching cycles per burst window. As a result, the inductor peak current will increase and the controller 424 will find a new equilibrium state.

In this way, the burst-control-module 440 regulates the compensation signal to a target range by setting the number of switching cycles in the bursts of the switch control signal. As a result, the burst-control-module 440 regulates the on-time of the switch control signal.

For very light-load conditions, the controller 424 will reduce the number of switching cycles per burst to one. In very light or zero-load conditions, the number of switching cycles per burst window may be one and the compensation signal (or on time/peak current) may fall below the lower-limit, $V_{c,min}$, of the target range. As a result, the efficiency and on-time of the controller 424 can reduce to undesirable levels. In some examples, the converter will enter a PFM mode when the number of switching cycles per burst window is one and the compensation signal is less than the lower-limit, $V_{c,min}$, of the target range. The PFM mode may comprise a pulse-skipping mode. A PFM mode can extend the load range of the controller to lower values without requiring a sleep mode.

Figure 4C:
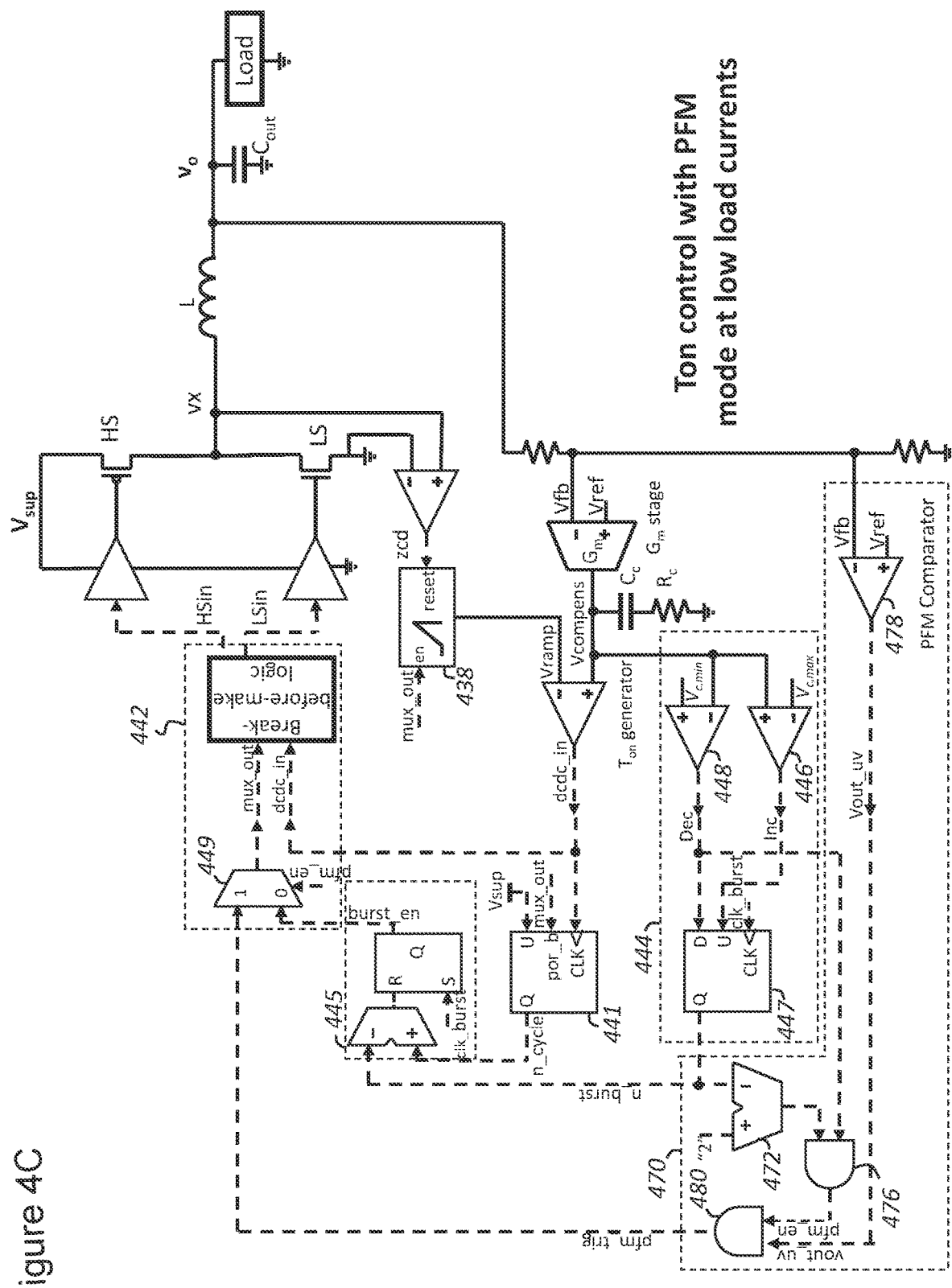
FIG. 4C illustrates a controller for a DC-DC converter with a light-load PFM mode according to a further embodiment of the present disclosure.

FIG. 4C illustrates a controller for a DC-DC converter with additional control for low loads according to an embodiment of the present disclosure. The embodiment is an extension of the controller of FIG. 4A and corresponding features have been given the same reference number and will not necessarily be described again here.

In this example, the controller 426 operates in a PFM mode if the compensation signal, $V_{compens}$, is less than the lower-limit of the target range and the number of switching cycles per burst window is set to one.

In this example, the controller further comprises a PFM-control-module 470 configured to set the controller into PFM mode (at very low loads). The PFM module 470 comprises a cycle-check module 472 which receives the total cycle signal, n_burst, from the total cycle register 447 of the cycle setter 444. The cycle check module 472 provides a cycle check signal indicative of whether the total cycle signal, n_burst, defines a total cycle value of 1 (switching cycle). The PFM module further comprises an AND gate 476. The AND gate 476 receives the cycle check signal as a first input. The AND gate also receives the decrement signal, Dec, from the lower-limit comparator 448 of the cycle setter 444 as a second input. The AND gate 476 outputs a PFM enable signal, pfm_en, which is high if both the cycle check signal (in case n_burst=1) and the comparator output signal, Dec, are both high.

In this example, the PFM-control-module 470 further comprises a low-voltage comparator 478 and a triggering AND gate 480. The low-voltage comparator 478 is configured to compare the output voltage, $V_o$, (or the feedback voltage, Vfb,) to the reference voltage, $V_{ref}$, and output an under-voltage signal, $V_{out\_uv}$, if the output voltage, $V_{out}$, is less than the reference voltage, $V_{ref}$. The triggering AND gate 480 receives the PFM enable signal, pfm_en, and the under-voltage signal, Vout_uv, as first and second inputs. The triggering AND gate 480 outputs a PFM trigger signal, pfm_trig, to the output module 442 if the PFM enable signal, pfm_en, and the under-voltage signal, Vout_uv, are both high.

In this example, the output module 442 further comprises a multiplexer 449 arranged prior to the BBM logic circuit. The multiplexer 449 receives the burst enable signal, burst_en, from the burst-control-module 440 and the PFM trigger signal, pfm_trig, from the PFM-control-module 470 as inputs. The multiplexer 449 selects one of the two inputs as a multiplex output signal, mux_out, and provides the selected input to the BBM circuit based on the state of the PFM enable signal, pfm_en, received from the PFM-control-module 470. In this example, the multiplex output signal, mux_out, is also provided to the cycle counter 441 and the ramp generator 438 instead of the burst enable signal, burst_en.

In operation, PFM mode is enabled, with the PFM enable signal, pfm_en, set to 1, if the total cycle signal, n_burst, defines one switching cycle and the comparator output signal, Dec, is asserted. When operating in PFM mode, if the output voltage, $V_o$, drops below the reference voltage, $V_{ref}$, the low-voltage comparator 478 asserts the under-voltage signal, $V_{out\_uv}$, and the triggering AND gate 480 asserts the PFM trigger signal, pfm_trig. In this way, a switching cycle is produced 'on-demand' rather than at every rising edge of the fixed-frequency burst clock. The PFM trigger signal, pfm_trig, is supplied to the BBM circuit via the multiplexer 449 when the PFM enable signal, pfm_en, is high. The BBM circuit will trigger the production of a single switching cycle. If the load current increases while in PFM mode, the comparator output signal, Dec, de-asserts, and the controller 424 immediately reverts to the normal control mode (as described with reference to FIG. 4A).

In some examples, the low-voltage comparator 478 may only compare the output voltage and reference voltage at each rising edge of the fixed-frequency burst clock and initiate a switching cycle if the output voltage is too low. In this way, the on-demand switching cycles are still produced at integer values of the period of the fixed-frequency burst clock. In this way, the PFM mode is a pulse-skipping mode in which the switch control signal is provided such that it produces one switching cycle for only some pulses (for example every other pulse) of the fixed-frequency burst clock (and no switching-cycles for the intervening pulses in the burst clock). As a result, even in the PFM mode, the output voltage frequency spectrum can advantageously remain under control at subharmonics of the burst clock frequency.

Note that the speed of the burst-control-module 440 can be higher than the speed of the on-time-control-module 434. This separation of bandwidth can ensure a stable interaction between the two control loops (controlling the number of switching cycles: fast loop; controlling the on-time or peak current: slow loop). In addition to loop bandwidth separation, each loop may be implemented in either the analog or the digital domain. In the embodiments of FIGS. 4A-C, the number of switching cycles is implemented in a (fast) digital loop, while the control of the on-time or peak current is done by a (slow) analog loop.

The burst-mode controllers disclosed herein have a number of advantages compared to a PFM controller and a PWM controller. Firstly, unlike a PFM controller, controllers of the present disclosure operate at a fixed fundamental frequency (like a PWM controller). This can be particularly advantageous for noise-sensitive loads as the burst clock frequency can be selected such that the voltage spectrum is outside any sensitive frequency bands of the load.

Figure 6:
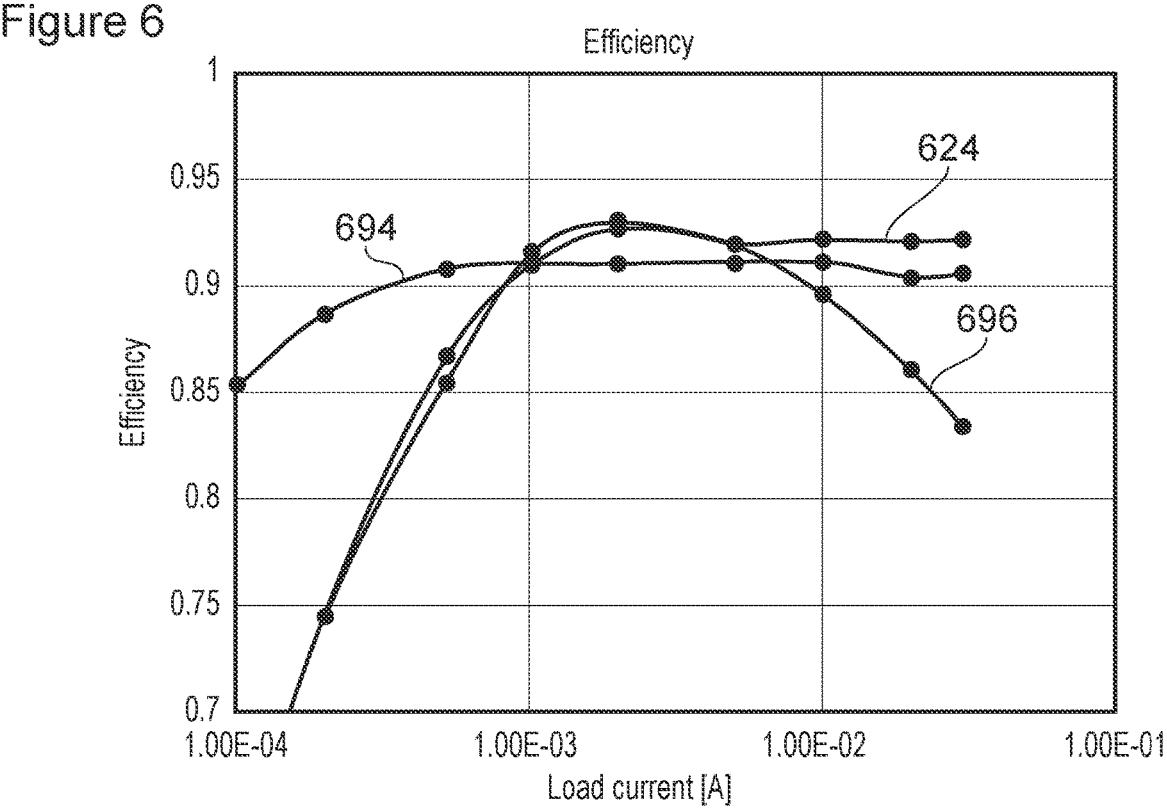
FIG. 6 illustrates the comparative efficiency of a controller according to an embodiment of the present disclosure compared to a PFM controller and a PWM controller.

A further advantage is that unlike a PWM controller, the disclosed controllers can maintain a high efficiency at heavy loads. FIG. 6 illustrates the comparative efficiency of three controllers. Three curves of efficiency versus load current are shown depicting: (i) a PFM controller 694, (ii) a 400 kHz PWM DCM controller 696, and (iii) a 400 kHz burst-mode controller 624 according to an embodiment of the present disclosure. The PWM controller 696 exhibits a reduced efficiency at light and heavy loads in a similar manner to the plots of FIG. 3. The disclosed burst-mode controller 624 shows a similar performance to the PWM controller 696 at light loads but maintains close to its peak efficiency at heavy loads. The improvement in heavy-load efficiency for the disclosed controller 624 is due to introducing more switching cycles per burst instead of increasing the inductor peak current further as in the PWM controller 696. Therefore, the conduction losses for the disclosed controller 624 increase proportional to the load in a similar manner to the PFM controller 694. In contrast, the conduction losses in the PWM controller 696 increase quadratically ($I^2R$ losses) due to the increase in peak current, resulting in a significant drop in efficiency. Note that the efficiency of the burst-mode controller 624 illustrated in FIG. 6 can be further improved by adding the PFM mode described above in relation to FIG. 4C. In that case, the efficiency of the controller 624 at light loads will be similar to the efficiency curve for the PFM controller 694, since both controllers will behave the same at light loads.

Figure 7:
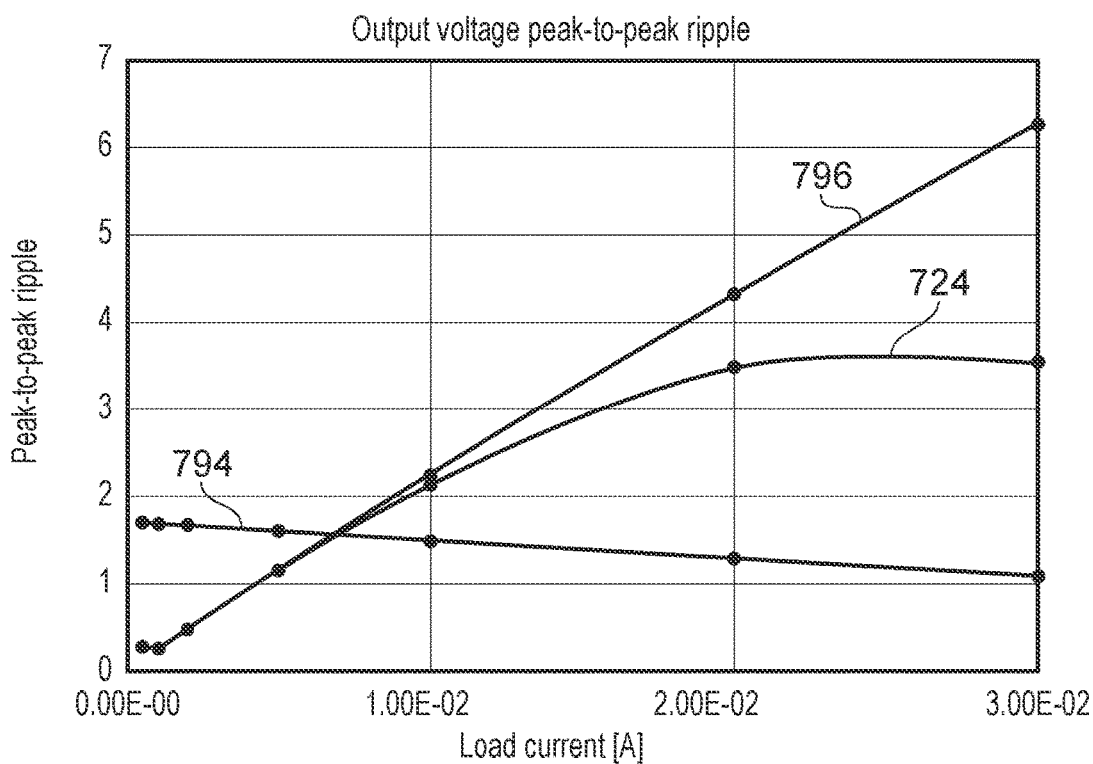
FIG. 7 illustrates the comparative output voltage ripple of a controller according to an embodiment of the present disclosure compared to a PFM controller and a PWM controller.

A further advantage of the disclosed controllers is that they have a lower heavy-load output voltage ripple compared to a PWM controller. FIG. 7 illustrates the comparative output voltage peak-to-peak ripple of three controllers. Three curves of peak-to-peak ripple versus load current are shown depicting a PFM controller 794, a 400-kHz PWM DCM controller 796 and a 400-kHz burst-mode controller 724 according to an embodiment of the present disclosure.

For the disclosed controller 724, the medium- to heavy-load output voltage ripple remains approximately constant because additional switching cycles are introduced for increasing load. In addition, because the switching cycles are clustered into a burst, the output-voltage-ripple fundamental frequency does not change with the load like in PFM control.

The present disclosure provides a burst-mode controller suitable for low-power inductive DCDC converters. The proposed burst-mode controller operates at a predetermined fixed burst frequency. The controller regulates the inductor peak current and number of switching cycles per burst in order to regulate the output voltage. The controller is able to maintain a constant fundamental frequency of the output voltage ripple, irrespective of the load.

The disclosed controllers combine an (analog) on-time or peak current control loop with a (digital) synchronous burst-mode controller (burst-control-module). The burst-control-module can vary the number of switching cycles per burst to limit the minimum and maximum on-time/peak current of the analog control loop.

Combining a variation in the number of switching cycles per burst with an on-time control can provide a level of hysteresis and prevent the number of switching cycles per burst varying periodically (back and forth) from one burst to the next. This can reduce sub-harmonic content in the spectrum.

Figure 8:
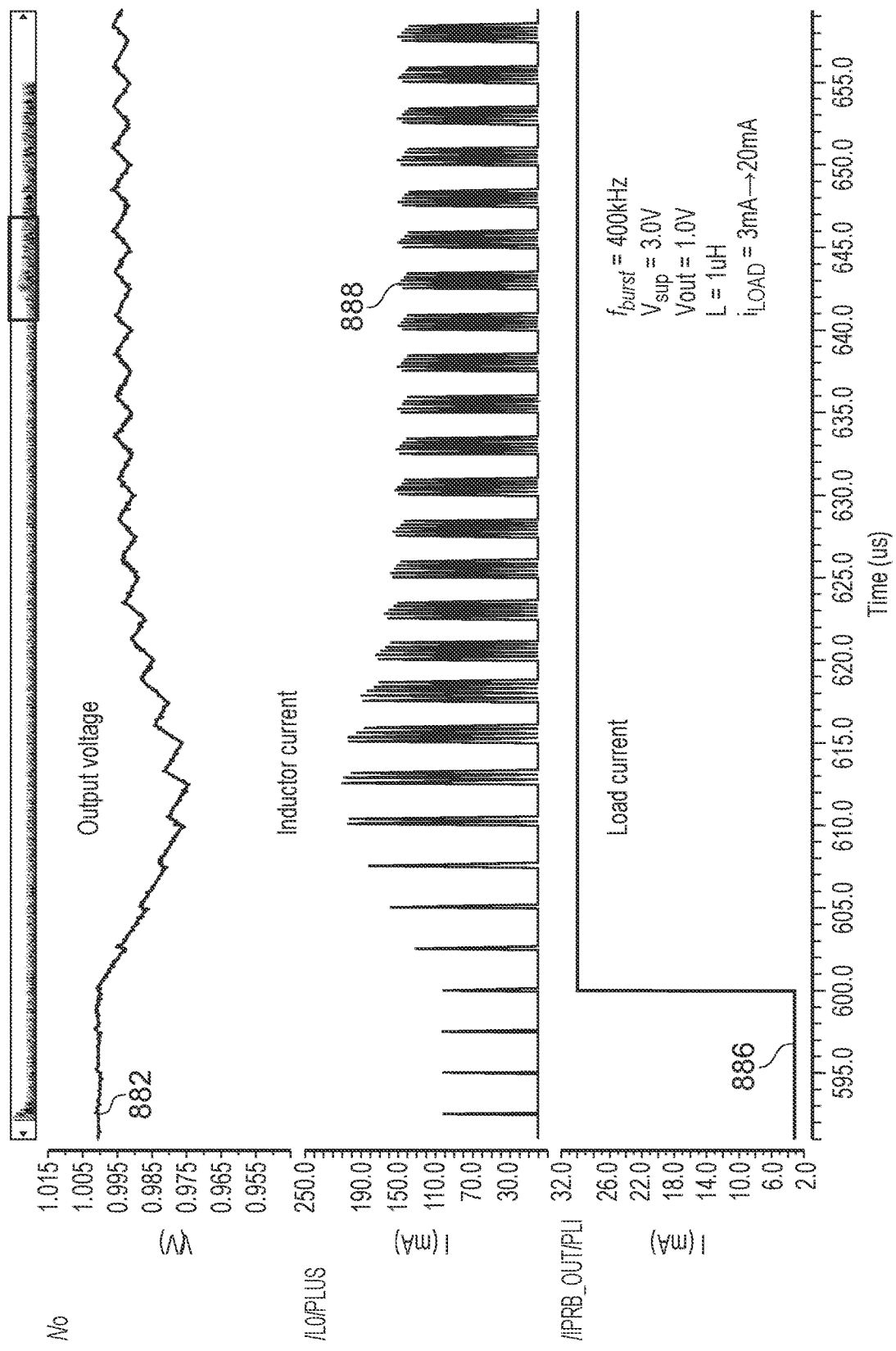
FIG. 8 illustrates the simulated performance of a controller according to an embodiment of the present disclosure.

FIG. 8 illustrates the simulated performance of a controller according to an embodiment of the present disclosure. The performance is illustrated for a load step from a light-to heavy-load and is consistent with the performance illustrated in FIG. 4. Output voltage 882, inductor current 888 and load current 886 are illustrated in the Figure. Parameters used for the simulation included: a frequency of 400 kHz for the fixed-frequency burst clock, a supply voltage of 3 V, a reference voltage of 1 V, an inductor inductance of 1 uH and a load current step from 3 mA to 30 mA.

The disclosed controller may be used in many applications, particularly those that require a low-power DC-DC converter with supply-noise-sensitive loads e.g. NFC or Bluetooth transceivers. The controller can be used in an inductive low-power switched-mode DCDC converter operating in burst mode. The controller can be applied to all common types of DC-DC converters such as buck, boost and buck-boost converters.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services.

These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal, and configured to:
receive the compensation signal, and
set the number of switching cycles for each burst window of the switch control signal to regulate the compensation signal to a target range by:
increasing the number of switching cycles if the compensation signal is greater than an upper-limit of the target range; and
decreasing the number of switching cycles if the compensation signal is less than a lower-limit of the target range.

2. The burst-mode controller of claim 1 wherein the burst-control-module is configured to set the number of switching cycles at each rising or falling edge of the fixed-frequency burst clock.

3. The burst-mode controller of claim 1 configured to control the DC-DC converter such that a current of an inductor in the DC-DC converter returns to zero between successive switching cycles of the bursts of the switch control signal.

4. The burst-mode controller of claim 1, wherein:
the on-time-control module comprises a ramp generator; and
the on-time-control module is configured to:
compare a ramp voltage from the ramp generator to the compensation signal; and
set the on-time of the switch control signal based on the comparison.

5. The burst-mode controller of claim 1, wherein the on-time-control module is configured to:
compare a current signal, indicative of an inductor current of the DC-DC converter, to the compensation voltage; and
set the on-time of the switch control signal based on the comparison.

6. A DC-DC converter comprising the burst-mode controller of claim 1.

7. The burst-mode controller of claim 1, wherein the burst-control-module is configured to:
receive a second compensation signal, wherein the second compensation signal is based on the output voltage of the DC-DC converter; and
set the number of switching cycles for each burst window of the switch control signal to regulate the second compensation signal to a target range.

8. The burst-mode controller of claim 7 wherein the second compensation signal comprises:
a separate signal to the compensation signal; or
the compensation signal.

9. The burst-mode controller of claim 1, wherein the compensation signal is based on a comparison of the output voltage of the DC-DC converter to a reference voltage.

10. The burst-mode controller of claim 1, further comprising an error module configured to provide the compensation signal.

11. The burst-mode controller of claim 10, wherein the error module comprises a $g_m$-stage error amplifier.

12. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal, and configured to:
receive the compensation signal, and
set the number of switching cycles for each burst window of the switch control signal to regulate the compensation signal to a target range,
wherein the burst-control-module is configured to increment or decrement the number of switching cycles by one switching cycle if the compensation signal is outside the target range.

13. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal, and configured to:
receive the compensation signal, and
set the number of switching cycles for each burst window of the switch control signal to regulate the compensation signal to a target range,
wherein the burst-control-module is configured to:
determine a deviation of the compensation signal from the target range; and
set the number of switching cycles based on the deviation.

14. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal, and configured to:
receive the compensation signal, and
set the number of switching cycles for each burst window of the switch control signal to regulate the compensation signal to a target range,
wherein the controller is configured to operate in a pulse-frequency-modulation, PFM, mode if the burst-control-module sets the number of switching cycles to one and the compensation signal is less than a lower-limit of the target range.

15. The burst-mode controller of claim 14, wherein the PFM mode comprises a pulse-skipping mode, wherein the burst-mode controller sets the number of switching cycles to zero for one or more burst windows of the switch control signal.

16. The burst-mode controller of claim 14, further comprising a PFM module configured to provide the PFM mode by producing a single switching cycle on-demand for one or more burst windows of the switch control signal if an output voltage of the DC-DC converter is less than a reference voltage.

17. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal,
wherein if the number of switching cycles of the bursts of the switch control signal is equal to a maximum cycle number, the burst-mode controller is configured to control the DC-DC converter such that a current of an inductor in the DC-DC converter does not return to zero between successive switching cycles of the bursts of the switch control signal.

18. A burst-mode controller for a DC-DC converter, the controller comprising:
an output module configured to provide a switch control signal to the DC-DC converter, the switch control signal comprising a plurality of burst windows, each burst window corresponding to a period of a fixed-frequency burst clock and comprising a number of switching cycles;
an on-time-control-module configured to:
receive a compensation signal, wherein the compensation signal is based on the output voltage of the DC-DC converter; and
set an on-time of the switching cycles of the switch control signal based on the compensation signal; and
a burst-control-module configured to regulate the on-time of the switching cycles of the switch control signal by setting the number of switching cycles for each burst window of the switch control signal, and configured to:
receive the compensation signal, and
set the number of switching cycles for each burst window of the switch control signal to regulate the compensation signal to a target range,
wherein the burst-control-module comprises:
a cycle setter configured to:
compare the compensation signal to the target range at each rising or falling edge of the fixed-frequency burst clock; and
output a total cycle signal defining the total number of switching cycles for a burst of the switch control signal;
a cycle counter configured to count the number of switching cycles of the burst and output a cycle count signal; and
a cycle comparator circuit configured to:
compare the total cycle signal to the cycle count signal; and
output a burst mode enable signal to the output module and the on-time-control-module, for indicating that a further switching cycle should be produced, based on the comparison of the cycle-count-signal and the total cycle signal.

* * * * *